United States Patent

[11] 3,603,174

| [72] | Inventors | Paul J. Patchen<br>Chicago;<br>Frank C. Kula, Markham, both of, Ill. |
|---|---|---|
| [21] | Appl. No. | 2,057 |
| [22] | Filed | Jan. 12, 1970 |
| [45] | Patented | Sept. 7, 1971 |
| [73] | Assignee | Allis-Chalmers Manufacturing Company<br>Milwaukee, Wis. |

[54] CAP SCREW WITH PILOTING SURFACE
10 Claims, 5 Drawing Figs.

[52] U.S. Cl. .................................. 74/594,
85/1 P, 287/189.36 F, 308/74, 29/526
[51] Int. Cl. .................................. G05g 1/12
[50] Field of Search .................................. 287/189.36
F, 20 P; 85/1 P, 46; 151/69; 74/579 E, 594;
308/74; 29/456, 526

[56] References Cited
UNITED STATES PATENTS

| 447,775 | 3/1891 | Higbee .......................... | 85/1 P |
| 1,847,742 | 3/1932 | Anderson ...................... | 74/579 E |
| 2,371,614 | 3/1945 | Graves ......................... | 74/579 E |
| 2,846,897 | 8/1958 | Schall ........................... | 74/579 E |
| 2,862,215 | 12/1958 | Gross ........................... | 85/46 X |
| 2,912,031 | 11/1959 | Bensinger et al. ............ | 74/579 E UX |

*Primary Examiner*—Reinaldo P. Machado
*Assistant Examiner*—Wayne L. Shedd
*Attorneys*—Arthur L. Nelson, Kenneth C. McKivett and Robert B. Benson

ABSTRACT: A screw-threaded member for piloting and fastening two parts in fixed relation to each other.

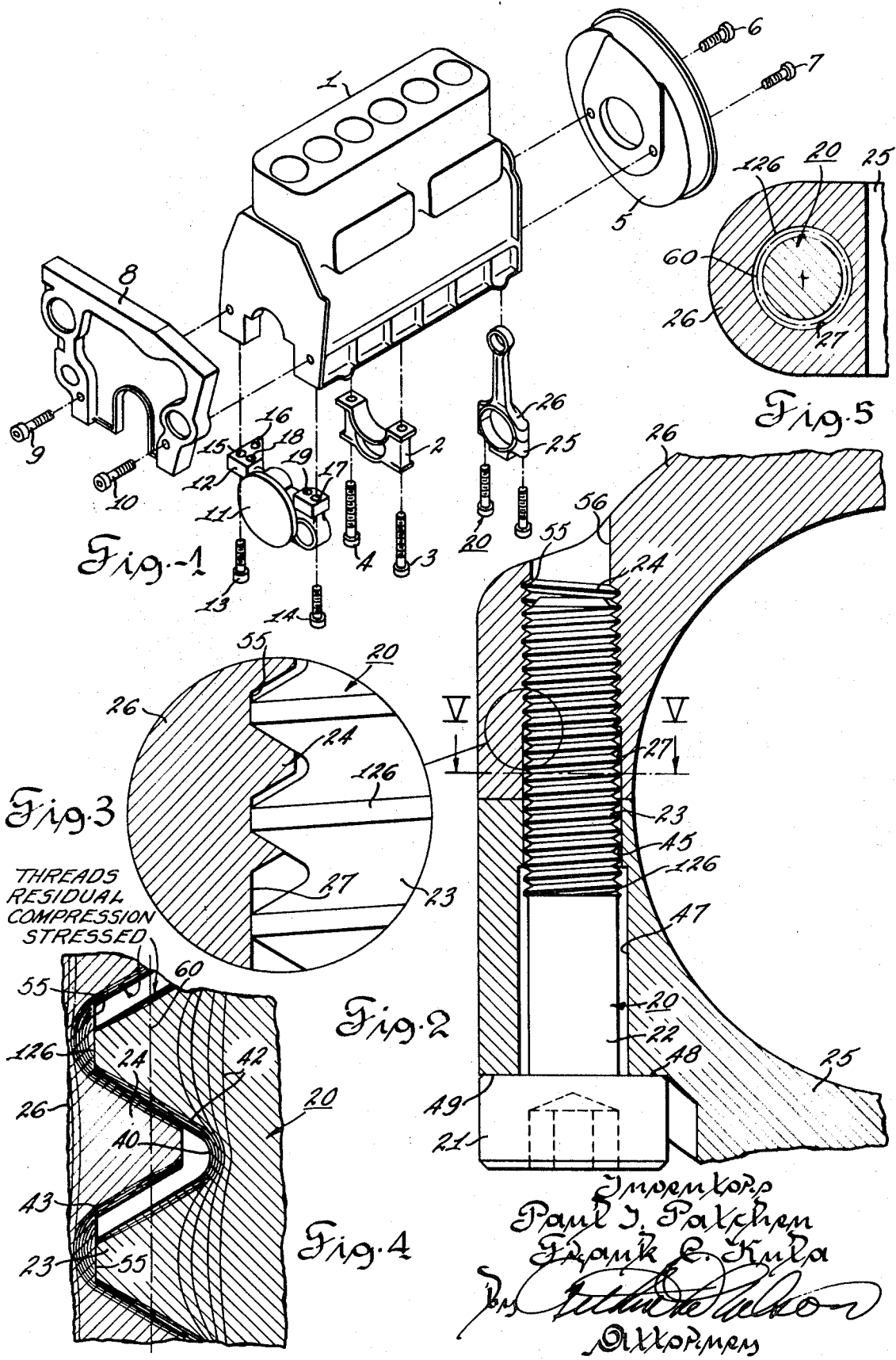

CAP SCREW WITH PILOTING SURFACE

This invention relates to a fastener and more particularly to a cap screw having a piloting surface defining its major diameter which pilots on a mating surface of each of the two or more parts for aligning and fastening the parts together in fixed relation to each other.

In the process of assembling components of an engine, apparatus, or machinery, alignment is often required to position shafts parallel for proper operation, to insure concentricity of components, for bearing alignment and for satisfying various other requirements. A particular example of this requirement is in the assembly of a bearing such as the main bearings, crank pin bearings on an engine. At one time bolts were used as a fastening means with a nut which was locked by a split key or a tab on a washer to prevent the nut from loosening from the bolt and permitting the disassembly of the bearing. Bearing assemblies today commonly use a capscrew for fastening of the bearing cap to the rod and this is particularly true wherein an oblique cut is made in the rod end. Conventional use of the cap screw requires a tongue and groove or serrated interference of the cap with the connecting rod for piloting of these two members while the cap screw provides the fastening means. This construction, however, is not as strong as is desired and generally provides only for lateral and not longitudinal piloting of the cap.

Accordingly this invention provides for concentricity between the pitch and the pilot diameters of the connecting rod to enable a cap screw with a concentric pitch and major diameter to be used as a piloting means. The threading of the rod with a piloting surface provides a concentric thread in which the major diameter guides the mating cap screw which in turn accurately locates the cap relative to the connecting rod and thereby assures an accurate fit in assembling of the bearing members on the crankpin.

Accordingly, it is an object of this invention to provide a capscrew with a piloting surface for aligning two parts while fastening the two parts together.

It is another object of this invention to provide a screw fastener having aligning surfaces defined by a surface on the major diameter of the thread for aligning the two members while fastening these members.

It is a further object of this invention to provide a fastener having a screw thread forming a piloting surface on its major diameter which engages mating piloting surfaces on two members for piloting while fastening the two members in fixed relation to each other.

The objects of this invention are accomplished by rolling the external surface of a capscrew to form-rolled threads. The rolled threads produce a larger external diameter than the shank portion of the capscrew. The major diameter is then formed by grinding a piloting surface concentric with the pitch diameter of the screw thread. Similarly, a rolled thread together with a piloting surface is formed on one of the members. The piloting surface on the first member is a cylindrical surface while the piloting surface on the second member is a segment of a cylindrical surface defining a helix formed by rolling thread. The major diameter of the screw thread in the second member is concentric and of the same diameter as the cylindrical piloting surface in the other member and the major diameter of the bolt engages both of these surfaces for piloting while fastening the two members together. This device aligns and fastens two members together and essentially eliminates the need for dowel pins for alignment while the fastening means is used to fasten the two members together.

The preferred embodiments of this invention are illustrated.

FIG. 1 illustrates an exploded view of various aligned members forming a subassembly of an engine.

FIG. 2 is a fragmentary cross section view of a connecting rod bearing.

FIG. 3 is an enlarged fragmentary section of FIG. 2 showing thread profiles.

FIG. 4 is a cross section view diagrammatically showing stresses in the threaded portion of the bolt and connecting rod.

FIG. 5 is a cross section view taken on line V—V of FIG. 2.

Referring the the drawings, FIG. 1 illustrates an engine block 1 with a main bearing cap 2 and capscrews 3 and 4 for assembling of the main bearing.

The flywheel housing 5 is connected to the block 1 by means of the capscrews 6 and 7.

The timing gear housing 8 is connected to the block 1 by means of the capscrews 9 and 10. The timing gear 11 is supported in the bearing support 12 which is fastened to the block by the capscrews 13 and 14. The timing gear shows a conventional means for mounting a subassembly in an engine. The openings 15, 16 and 17 receive capscrews while the openings 18 and 19 are adapted for receiving dowels which align the members. The dowels align two members in two directions while the capscrew will fasten the two members together. The use of capscrews set forth in this invention will eliminate the need for using dowels for aligning since the piloting surface on the cap screw provides the aligning while the cap screws provides the aligning while the cap screw itself provides the fastening means.

Referring to FIG. 2 a capscrew 20 includes a head portion 21 and a shank portion 22. The other end of the capscrew has a threaded portion 23 engages a mated threaded portion 24 in the connecting rod 26 to which the cap 25 is fastened. The capscrew 20 serves as an aligning and fastening means and another capscrew similar to the capscrew 20 shown is also used on the opposite side of the bearing assembly to provide aligning and fastening means.

Referring to FIG. 3 the thread 23 of the capscrew 20 is shown within the thread 24 of the connecting rod 26. The thread on the capscrew 20 is a rolled thread and the major diameter is defined by the ground surface 126. The ground surface 126 forming the major diameter of the screw thread is concentric with the pitch diameter 60 of the screw thread and accordingly concentric with the axis of the capscrew 20. The surface 126 is a piloting surface which is used to align the cap 25 with the rod 26. Similarly a surface 55 is formed on the thread profile of the thread 24 of the cap 25. The surface 55 is a helical surface which is formed by an extruding process in deforming the metal on the periphery of the opening 56. The surface 27 is a continuous and concentric surface with surface 55. The surface 126 is a piloting surface engaging the surfaces 26, 55 and 45 which also operate as piloting surfaces for aligning the cap with a connecting rod.

Referring to FIG. 4 a stress diagram is schematically illustrated in the screw and rod threads. Fatigue failure is of concern in threaded members such as capscrews having repeated loadings at high stress levels. Externally threaded members formed by thread rolling methods are generally considered superior in fatigue strength to threads formed by other methods and accordingly, the threads used on these capscrews are made by a rolling method. For highest fatigue life it is necessary that the root surface where tensile stress will be greatest under applied load have a residual compressive stress. The higher the residual compressive stress at or near the root surface, the less the probability of a tensile fatigue crack. Accordingly, a residual compressive stress is induced at this point by rolling to overcome the tensile stress which will be greatest at this point. Any fissures and cracks normally produced in other methods of thread forming are not as likely to be produced and the compressive stress in the area prevents any excessive tensile stress causing a growing of the cracks producing failure in these areas.

Referring to FIG. 4 the stress conditioning and concentration of the thread are illustrated diagrammatically. The degree of the residual stress in the threads is indicated by the concentration of the stress lines in the cross section view. It is noted that the greatest concentration of stress lines is at the root 40 of the threads 23 and the surface 55 on the threads 24. Since the highest fatigue strength is needed near the root surface of the threads because the tensile stress will be greatest, it is accordingly desirable to increase the compressive stress at this point. With a high compressive stress at this point the compressive stress must be overcome before the metal at this point will be subjected to any tensile stress which will cause the bolt or the screw to fail.

The total thread surface is subjected to a residual compressive stress which is indicated by the concentration lines 42 and 43. The surface 126 is ground and accordingly substantially reduces the concentrated stress at this point. Any incipient cracks which may have been produced during grinding on surface 126 would not present a problem since the capscrew thread is generally under a compressive stress. It is understood that the stress lines cannot fully illustrate the stress condition of the screw threads, but they are illustrative of the general stressed condition of the screw threads which increase the fatigue life of the capscrew.

Referring to FIG. 2 the screw fastener is illustrated in a fastening position. The fastener can be used in any location to locate two parts relative to each other while simultaneously function of piloting and fastening which ordinarily would require dowel pins for the piloting, and a screw thread in a bolt or capscrew for fastening.

The aligning and fastening is accomplished in the following manner. The two members are formed with piloting surfaces. The rod member 26 defines a screw thread in which the piloting surface 55 defines a helical surface forming a major diameter of the thread root. This surface defines a segment of a cylinder which is the continuation of the cylindrical surface 27 in the rods member 26 which is concentric with surface 45 of cap member 25. Surface 27 or surface 55 could operate independently as a piloting surface. A screw thread 23 forms the aligning means for aligning these two members. As the capscrew 20 is inserted within the opening 47 the shank portion 22 clears the opening 47 to prevent any fretting of these two surfaces. The helical surface 126 of the screw thread 23 defines a helical piloting surface 126 of the screw thread 23 defines a helical piloting surface which aligns the two members 25 and 26. The screw surface 126 initially engages the cylindrical surface 45 and subsequentially engages the surface 27 and helical surface 55 to align the member 25 with the member 26. As the screw thread 23 is received within the screw thread 24 the alignment of the two members is maintained. The screw thread continues to advance into the member 26 until the base 48 of the capscrew head 21 engages the mating surface 49 on the member 25. The two members 25 and 26 are maintained in a fixed location by the piloting surfaces and fastened by means of a screw thread.

The embodiments of the invention in which an exclusive property or privilege is claimed are defined as follows:

1. A fastener fastening two members comprising, at least one screw fastener, a first member defining a cylindrical piloting surface, a second member defining piloting surface, said screw fastener defining a screw thread including a major diameter piloting surface engaging the piloting surfaces of said members to thereby align the members while fastening the members in a fixed relation relative to each other.

2. A screw fastener fastening two members as set forth in claim 1 wherein the major diameter of the screw fastener defines a helical piloting surface.

3. A screw fastener fastening two members as set forth in claim 1 wherein the two members include a connecting rod and a connecting rod cap defining a bearing.

4. A screw fastener fastening two members as set forth in claim 1 including said first member defining a cylindrical surface, said second member defining a helical segment of a cylindrical surface, said screw fastener defining a helical surface concentrically aligning said cylindrical surface of said first member and the helical surface of said second member.

5. A fastener fastening two members as set forth in claim 1 wherein the screw thread on said fastener defines a pitch diameter concentric with the major diameter defining the piloting surface.

6. A fastener fastening two members as set forth in claim 1 wherein said second member defines a compressive stressed screw thread to thereby increase fatigue life of said member.

7. A fastener fastening two members as set forth in claim 1 wherein said screw fastener includes a capscrew defining a shank portion of a smaller diameter than the major diameter of said screw thread on said fastener to thereby eliminate fretting on the shank portion of said fastener in one of said members.

8. A fastener fastening two members as set forth in claim 1 wherein a fastener is a capscrew.

9. A fastener fastening two members as set forth in claim 1 wherein said second member defines a cylindrical piloting surface of the same diameter as the cylindrical piloting surface at said first member to thereby provide alignment of said two members.

10. A fastener fastening two members as set forth in claim 1 wherein said fastener defines a compressive stressed screw thread to thereby increase the fatigue life of said fastener.